US012320308B2

(12) United States Patent
Horibe et al.

(10) Patent No.: US 12,320,308 B2
(45) Date of Patent: Jun. 3, 2025

(54) THROTTLE CONTROL SYSTEM, THROTTLE CONTROL METHOD, AND MEMORY MEDIUM

(71) Applicant: TOYOTA JIDOSHA KABUSHIKI KAISHA, Toyota (JP)

(72) Inventors: Fukiko Horibe, Toyota (JP); Hiroshi Fujitani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 297 days.

(21) Appl. No.: 18/308,957

(22) Filed: Apr. 28, 2023

(65) Prior Publication Data

US 2023/0383701 A1 Nov. 30, 2023

(30) Foreign Application Priority Data

May 25, 2022 (JP) ................................ P2022-085332

(51) Int. Cl.
*F02D 11/10* (2006.01)

(52) U.S. Cl.
CPC ...... *F02D 11/105* (2013.01); *F02D 2011/101* (2013.01)

(58) Field of Classification Search
CPC .... F02D 11/005; F02D 11/006; F02D 11/007; F02D 41/221; F02D 2011/101; F02D 2011/108; F16K 31/043; F16K 31/047
See application file for complete search history.

(56) References Cited

U.S. PATENT DOCUMENTS

| | | | | |
|---|---|---|---|---|
| 6,349,701 | B1 * | 2/2002 | Sakurai | F02D 9/1065 123/399 |
| 6,575,427 | B1 * | 6/2003 | Rauch | F02D 11/10 251/285 |
| 7,921,711 | B2 * | 4/2011 | Noda | F02D 41/221 123/90.15 |
| 2009/0205610 | A1 * | 8/2009 | Jumonji | F02D 11/107 123/399 |
| 2017/0218835 | A1 * | 8/2017 | Mito | F02B 33/34 |

FOREIGN PATENT DOCUMENTS

| | | |
|---|---|---|
| JP | 2012-117500 A | 6/2012 |
| JP | 2015-81510 A | 4/2015 |

* cited by examiner

*Primary Examiner* — Grant Moubry
(74) *Attorney, Agent, or Firm* — Oblon, McClelland, Maier & Neustadt, L.L.P.

(57) ABSTRACT

A driving process causes a target angular position of a specific gear in a throttle device to reach an initial position by continuing to increase or decrease the target angular position at a constant speed. A determination process determines that wear has occurred on a gear mechanism in the throttle device based on a parameter related to a change speed of an angular position in a specific range during execution of the driving process. The specific range is a range from a specific angular position to the initial position. The specific angular position is the angular position that is separated from the initial position by a predetermined constant angle.

10 Claims, 7 Drawing Sheets

THROTTLE CONTROL SYSTEM, THROTTLE CONTROL METHOD, AND MEMORY MEDIUM

BACKGROUND

1. Field

The present disclosure relates to a throttle control system, a throttle control method, and a memory medium.

2. Description of Related Art

Typical throttle controllers control a throttle device. The throttle device includes an electric motor having a driving shaft, a gear mechanism having gears, a driven shaft that is rotated by the gear mechanism, and a throttle valve that is selectively opened and closed by rotation of the driven shaft. The gear mechanism is driven by rotation of the driving shaft. Based on the depression amount of an accelerator pedal, a throttle controller drives the electric motor to selectively open and close the throttle valve.

Even if the depression amount of the accelerator pedal changes, the open degree of the throttle valve may remain unchanged. In this case, the throttle controller determines that an anomalous condition, namely, sticking of the throttle valve, has occurred.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a throttle control system that includes a throttle device and control circuitry that controls the throttle device. The throttle device includes: an electric motor having a driving shaft; a gear mechanism having gears, the gear mechanism being driven by rotation of the driving shaft; a driven shaft that is rotated by the gear mechanism; a throttle valve that is selectively opened and closed by rotation of the driven shaft; a rotation sensor that obtains an angular position of a specific gear, the specific gear being one of the gears; and a spring mechanism that biases the specific gear such that the angular position becomes a predetermined initial position when the specific gear does not receive torque from the electric motor or the driven shaft. The control circuitry executes a driving process that causes a target angular position of the specific gear to reach the initial position by continuing to increase or decrease the target angular position at a constant speed. The control circuitry further executes a determination process that determines that wear has occurred on the gear mechanism based on a parameter related to a change speed of the angular position in a specific range during execution of the driving process. The specific range is a range from a specific angular position to the initial position. The specific angular position being the angular position that is separated from the initial position by a predetermined constant angle.

The above configuration refers to a change in the change speed of the angular position in the specific range during the execution of the driving process to detect an increase in the gap between the gears from the electric motor to the specific gear. The increase in the gap between the gears is substantially directly reflected on the progress of the wear on the gears. Accordingly, the above configuration accurately determines that wear has occurred on the gear mechanism.

In the gear mechanism of the typical throttle device, the gears receive torque when the throttle valve is selectively opened and closed. Thus, when the gear mechanism is repeatedly driven, wear occurs on the gears. However, in the typical throttle device, the wear on the gears are not taken into consideration. That is, the typical throttle device cannot determine the wear on the gears of the gear mechanism. Such a problem is reduced by the above configuration.

In the throttle control system, the specific gear may rotate integrally with the driven shaft. In this configuration, the sensor that obtains the open degree of the throttle valve can be used as a rotation sensor. This eliminates the need for a new sensor dedicated for detecting the angular position of the specific gear. Additionally, in the configuration, the specific gear is located on the most downstream side of the torque transmission path from the electric motor to the driven shaft. This allows the determination process to accurately determine that the wear has occurred on the gear mechanism when wear occurs on any of the gears of the gear mechanism.

In the throttle control system, one or more of the gears selected from the specific gear and a gear that is located between the specific gear and the electric motor on a transmission path for torque from the electric motor to the driven shaft may be made of synthetic resin. In this configuration, wear easily occurs on synthetic resin gears. In this manner, for gears that become easily worn, the throttle control system can determine wear on the gear mechanism in a particularly favorable manner.

In the throttle control system, the control circuitry may further execute a warning process that outputs a warning signal by operating a predetermined hardware when the determination process determines that wear has occurred on the gear mechanism. The above configuration executes the warning process to output the warning signal. This allows a user or the like to be notified that wear has occurred.

In the throttle control system, a unit change amount is a change amount of the angular position per unit time during the execution of the driving process. A target angular position is the angular position that is predetermined in the specific range. The parameter related to the change speed of the angular position is the unit change amount. The determination process may determine that wear has occurred on the gear mechanism when an absolute value of the unit change amount in a case in which the angular position is the target angular position is less than a predetermined threshold value.

The above configuration determines wear on the gear mechanism using the absolute value of the unit change amount obtained when the angular position is the target angular position in the specific range. Thus, when a point to become worn is predictable from the shape or the like of the gear, the wear can be readily detected without using excessively complicated processes.

In the throttle control system, the control circuitry stores a predetermined number of absolute values of the unit change amount at the target angular position, the absolute values being updated to be included sequentially from newer ones of the absolute values each time the driving process is executed. The determination process may determine that wear has occurred on the gear mechanism when an average value of the stored absolute values of the unit change amount is less than the threshold value.

The above configuration determines that wear has occurred on the gear mechanism when the average value of the absolute values of the unit change amount is less than the threshold value. Thus, as compared to the case of determining that wear has occurred on the gear mechanism when one absolute value of the unit change amount is less than the threshold value, the variations in each absolute value of the unit change amount have a smaller influence on one driving process.

In the throttle control system, an angular acceleration is an acceleration of the angular position during the execution of the driving process. The parameter related to the change speed of the angular position is the angular acceleration. The determination process may determine that wear has occurred on the gear mechanism when a maximum value of an absolute value of the angular acceleration in the specific range is less than a predetermined acceleration threshold value. In this configuration, even when a point of the gear at which wear occurs cannot be identified in advance, the maximum value of the absolute value of the angular acceleration is used to determine the wear on the gear mechanism.

In the throttle control system, the control circuitry stores a predetermined number of maximum values of the absolute value of the angular acceleration at the target angular position, the maximum values being updated to be included sequentially from newer ones of the maximum values each time the driving process is executed. The determination process may determine that wear has occurred on the gear mechanism when an average value of the stored maximum values of the absolute value of the angular acceleration is less than the acceleration threshold value.

The above configuration determines that wear has occurred on the gear mechanism when the average value of the maximum values of the absolute value of the unit change amount is less than the acceleration threshold value. Thus, as compared to the case of determining that wear has occurred when one maximum value of the absolute value of the angular change amount is less than the acceleration threshold value, the variations in each absolute value of the angular acceleration have a smaller influence on one driving process.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A throttle control system 300, a throttle control method, and a throttle control process according to a first embodiment will now be described with reference to FIGS. 1 to 6. The throttle control system 300, the throttle control method, and the throttle control processes are employed in a vehicle.

Schematic Configuration of Vehicle

Figure 1:
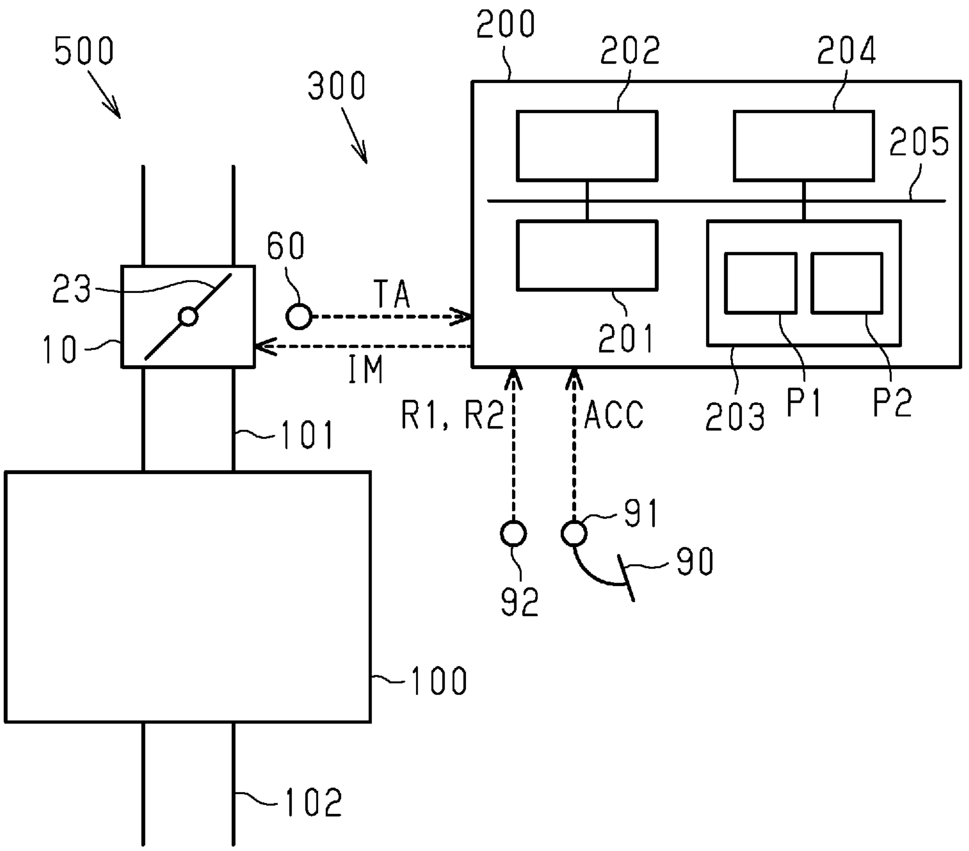
FIG. 1 is a schematic diagram showing the configuration of a vehicle.

As shown in FIG. 1, a vehicle 500 includes an internal combustion engine 100, an intake passage 101, and an exhaust passage 102.

The internal combustion engine 100 is connected to the intake passage 101, into which intake air is drawn from the outside of the vehicle 500. Further, the internal combustion engine 100 is connected to the exhaust passage 102, from which exhaust gas is discharged to the outside of the vehicle 500.

The vehicle 500 includes the throttle control system 300. The throttle control system 300 includes a throttle device 10 and a controller 200. The throttle device 10 is located in the intake passage 101. The throttle device 10 adjusts the amount of intake air that flows into the internal combustion engine 100.

The vehicle 500 includes an accelerator pedal 90 and an accelerator pedal sensor 91. The accelerator pedal sensor 91 is located near the accelerator pedal 90. The accelerator pedal sensor 91 outputs an accelerator depression amount ACC, which indicates the depression amount of the accelerator pedal 90.

The vehicle 500 includes an ignition switch 92. The ignition switch 92 is located near the driver's seat of the vehicle 500. The ignition switch 92 issues a start request R1 when turned on in a state in which the internal combustion engine 100 is not running. The ignition switch 92 issues a stop request R2 when turned off in a state in which the internal combustion engine 100 is driven.

Throttle Device

Figure 2:
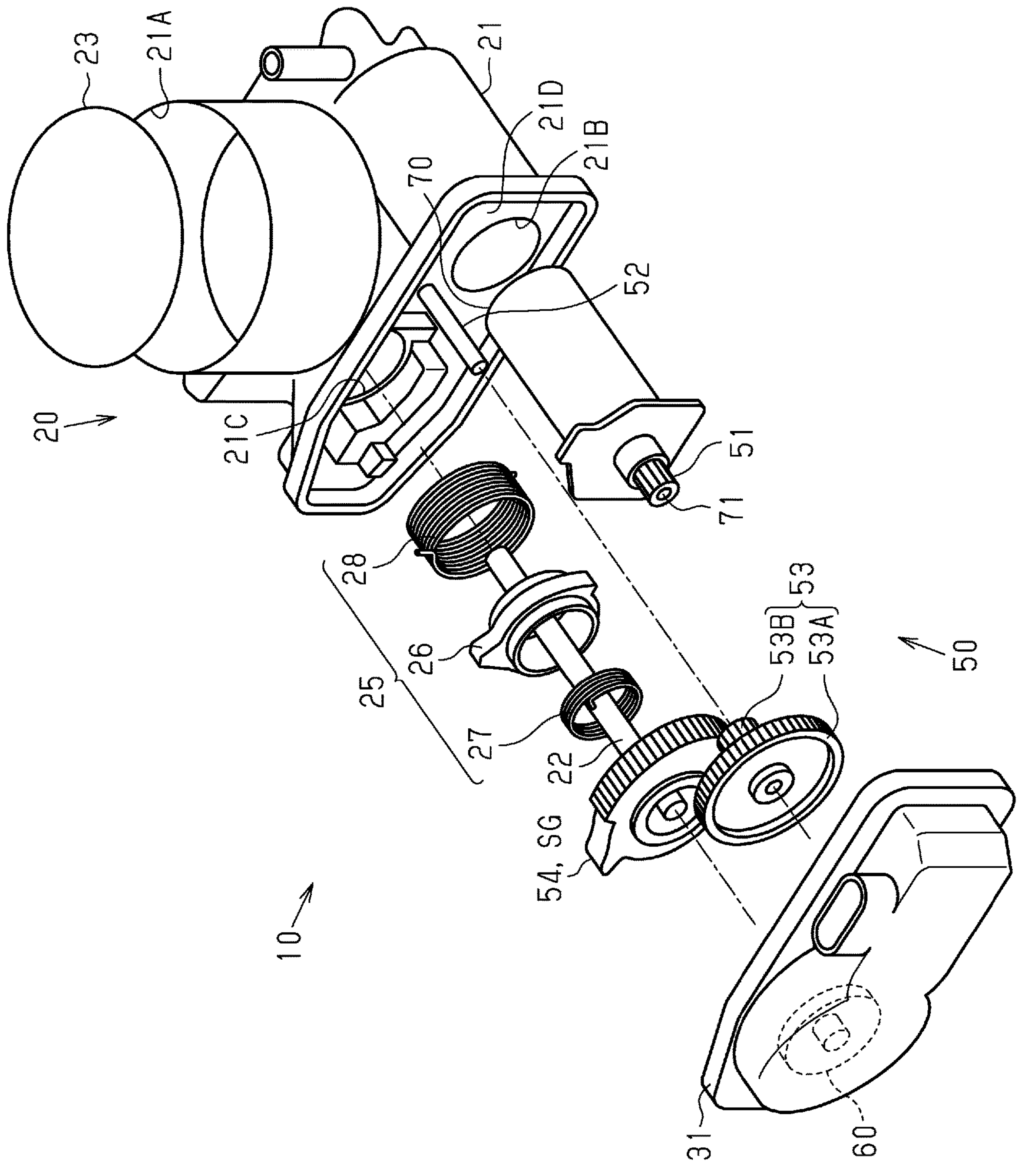
FIG. 2 is an exploded perspective view of the throttle device shown in FIG. 1.

As shown in FIG. 2, the throttle device 10 includes a valve mechanism 20 and an electric motor 70.

The valve mechanism 20 includes a housing 21 and a cover 31. The housing 21 defines a valve accommodation space 21A. The valve accommodation space 21A is columnar. The valve accommodation space 21A has two open ends. The valve accommodation space 21A is a part of the intake passage 101. Thus, intake air flows through the valve accommodation space 21A.

The housing 21 defines a motor accommodation space 21B. The motor accommodation space 21B is columnar. On a projected surface, the central axis of the motor accommodation space 21B is orthogonal to that of the valve accommodation space 21A. The motor accommodation space 21B is separate from the valve accommodation space 21A. Thus, the motor accommodation space 21B does not connect to the valve accommodation space 21A. The motor accommodation space 21B has a closed first end, which is directed toward the right end in FIG. 2. The motor accommodation space 21B has a second end, which is directed toward the left side in FIG. 2 and opens toward the outside of the housing 21.

The housing 21 defines a shaft accommodation hole 21C. The shaft accommodation hole 21C is columnar. The central axis of the shaft accommodation hole 21C is orthogonal to that of the valve accommodation space 21A. Further, the central axis of the shaft accommodation hole 21C intersects that of the valve accommodation space 21A. The shaft accommodation hole 21C has a first end, which is directed toward the right end in FIG. 2 and opens toward the valve accommodation space 21A. The shaft accommodation hole 21C has a second end, which is directed toward the left side in FIG. 2. The second end opens toward the outside of the housing 21. The second end of the shaft accommodation hole 21C is located on the same side as the second end of the motor accommodation space 21B.

The cover 31 covers part of the housing 21. The cover 31 covers the openings (i.e., the second ends) of the motor accommodation space 21B and the shaft accommodation hole 21C. The cover 31 and the housing 21 define a gear accommodation space 21D. The gear accommodation space 21D connects to the motor accommodation space 21B and the shaft accommodation hole 21C.

The valve mechanism 20 includes a driven shaft 22. The driven shaft 22 has the form of a bar. The driven shaft 22 extends through the shaft accommodation hole 21C along the central axis of the shaft accommodation hole 21C. The driven shaft 22 is supported by the housing 21 with a bearing (not shown). Thus, the driven shaft 22 is rotatable relative to the housing 21.

The valve mechanism 20 includes a throttle valve 23. The throttle valve 23 is located in the valve accommodation space 21A. The throttle valve 23 has the form of a disk. The diameter of the throttle valve 23 is slightly smaller than the inner diameter of the valve accommodation space 21A. The throttle valve 23 is fixed to the driven shaft 22. The throttle valve 23 rotates integrally with the driven shaft 22. Thus, the throttle valve 23 is selectively opened and closed by the rotation of the driven shaft 22.

The valve mechanism 20 includes a spring mechanism 25. The spring mechanism includes a joint 26, a first spring 27, and a second spring 28. The joint 26 is flat and substantially tubular. One end of the joint 26 with respect to its central axis is open and the other end is closed. That is, the joint 26 has a bottom surface. The driven shaft 22 extends through the bottom surface of the joint 26. The joint 26 is held by the driven shaft 22. The first spring 27 is located in the joint 26. The first spring 27 is a coil spring. The first spring 27 applies torque acting in one direction to the joint 26. The second spring 28 is located outside of the joint 26. The second spring 28 surrounds the joint 26. The second spring 28 applies, to the joint 26, torque acting in the direction opposite of the direction of the torque applied by the first spring 27. When no external force acts on the valve mechanism 20, the torque from the first spring 27 and the second spring 28 keeps an angular position TA of the driven shaft 22 at an initial position X. The initial position X is defined as the angular position TA of the driven shaft 22 at which the throttle valve 23 has an open degree that permits the flow of intake air through the valve accommodation space 21A by an amount needed for the vehicle to travel in a limp mode. The open degree of the throttle valve 23 at which the angular position TA of the driven shaft 22 is the initial position X is, for example, a few percent relative to the open degree in a fully-open state.

The electric motor 70 is located in the motor accommodation space 21B. The electric motor 70 includes a driving shaft 71. The driving shaft 71 is located in the gear accommodation space 21D. The driving shaft 71 extends parallel to the driven shaft 22. The electric motor 70 transmits torque to the driven shaft 22 through a gear mechanism 50. That is, the electric motor 70 is a driving source of the throttle valve 23. The electric motor 70 is connected to a battery (not shown).

The throttle device 10 includes the gear mechanism 50. The gear mechanism 50 includes gears and is driven by the rotation of the driving shaft 71. Specifically, the gear mechanism 50 includes a driving gear 51, a support shaft 52, a first driven gear 53, and a second driven gear 54. The driving gear 51 is a spur gear. The driving gear 51 is held by the driving shaft 71. The driving gear 51 rotates integrally with the driving shaft 71. The driving gear 51 is made of metal.

The support shaft 52 extends from the housing 21. The support shaft 52 extends parallel to the driving shaft 71. The support shaft 52 is located between the driving shaft 71 and the driven shaft 22.

The first driven gear 53 is held by an end of the support shaft 52. The first driven gear 53 includes a large-diameter gear 53A and a small-diameter gear 53B. The large-diameter gear 53A and the small-diameter gear 53B are spur gears. The outer diameter of the large-diameter gear 53A is larger than that of the driving gear 51. The outer diameter of the large-diameter gear 53A is larger than that of the small-diameter gear 53B. The large-diameter gear 53A is coaxial with the small-diameter gear 53B. The large-diameter gear 53A is integrated with the small-diameter gear 53B. The large-diameter gear 53A meshes with the driving gear 51. The first driven gear 53 decelerates the rotation of the driving gear 51 and outputs the decelerated rotation. The first driven gear 53 is made of synthetic resin.

The second driven gear 54 is a spur gear. The second driven gear 54 meshes with the small-diameter gear 53B. The second driven gear 54 is held by the driven shaft 22. Thus, the second driven gear 54 rotates integrally with the driven shaft 22. That is, the driven shaft 22 is rotated by the gear mechanism 50. The second driven gear 54 is made of synthetic resin.

In this manner, the three gear members (51, 53, 54) of the gear mechanism 50 allow torque to be transmitted from the driving shaft 71 of the electric motor 70 to the driven shaft 22, to which the throttle valve 23 is fixed. As described above, the gears on the transmission path for torque from the electric motor 70 to the driven shaft 22 are arranged in the order of the driving gear 51, the large-diameter gear 53A, the small-diameter gear 53B, and the second driven gear 54 from the upstream side toward the downstream side. In this embodiment, the second driven gear 54 is a throttle gear. The first driven gear 53 is an intermediate gear.

The throttle device 10 includes a rotation sensor 60. The rotation sensor 60 obtains the angular position TA of a specific gear SG, which is one of the gears of the gear mechanism 50. In the present embodiment, the specific gear SG is the second driven gear 54. Thus, the rotation sensor 60 obtains the angular position TA of the second driven gear 54.

The rotation sensor 60 is incorporated in the cover 31. The rotation sensor 60 is located around the driven shaft 22. The rotation sensor 60 is a contactless Hall sensor that detects the angular position TA of the driven shaft 22 as a change in a magnetic field. Since the second driven gear 54 rotates integrally with the driven shaft 22 as described above, the angular position TA of the driven shaft 22 is equal to that of the second driven gear 54. That is, the present embodiment obtains the angular position TA of the driven shaft 22 to obtain that of the second driven gear 54.

Controller

The controller 200 is control circuitry that controls the throttle device 10. As shown in FIG. 1, the controller 200 obtains the accelerator depression amount ACC, which is output from the accelerator pedal sensor 91. The controller 200 obtains the start request R1 and the stop request R2, which are sent from the ignition switch 92. The controller 200 obtains the angular position TA, which is output from the rotation sensor 60. The angular position TA obtained when the throttle valve 23 is fully closed is hereinafter zero. The larger the open degree of the throttle valve 23, the larger the angular position TA.

The controller 200 is control circuitry that includes a CPU 201, peripheral circuitry 202, a ROM 203, a memory device 204, and a bus 205. The bus 205 connects the CPU 201, the peripheral circuitry 202, the ROM 203, and the memory device 204 such that they are communicable with each other. The peripheral circuitry 202 includes a circuit that generates a clock signal regulating internal operations, a power supply circuit, and a reset circuit. The ROM 203 stores, in advance, various programs with which the CPU 201 executes various types of control. The CPU 201 is a processing device that executes the various programs stored in the ROM 203 to control the throttle device 10. The ROM 203 stores a normal program P1 and a gear wear determination program P2.

When obtaining the start request R1, the CPU 201 repeatedly executes the normal program P1. Based on how large the obtained accelerator depression amount ACC is, the CPU 201 calculates a target angular position TTA. As the accelerator depression amount ACC becomes larger, the CPU 201 calculates the target angular position TTA such that a target throttle open degree becomes larger. The CPU 201 supplies the electric motor 70 with current IM that corresponds to the calculation result. When obtaining the stop request R2, the CPU 201 stops executing the normal program P1. That is, when the internal combustion engine 100 is being driven, the CPU 201 repeatedly executes the normal program P1.

Series of Processes that Determine Wear on Gear Mechanism

When obtaining the stop request R2, the CPU 201 executes the gear wear determination program P2 once.

Figure 3:
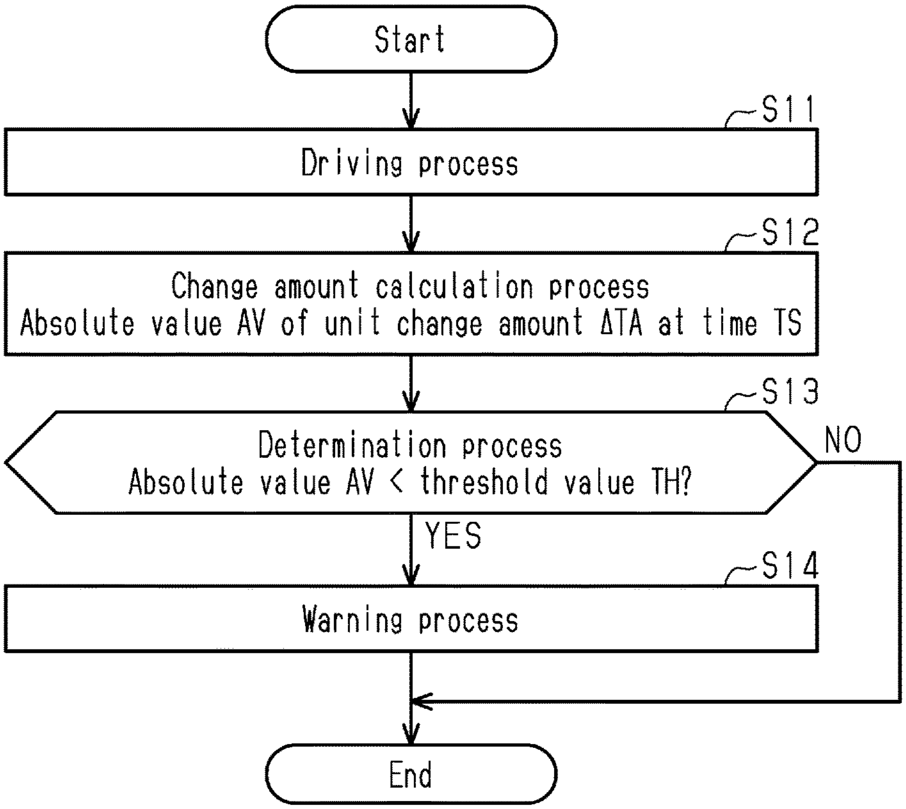
FIG. 3 is a flowchart illustrating a series of processes that determine wear on the gear mechanism shown in FIG. 2 in the first embodiment.

As shown in FIG. 3, after starting the gear wear determination program P2, the CPU 201 first executes the process of step S11. In step S11, the CPU 201 executes a driving process. The driving process is a process that causes the target angular position TTA of the specific gear SG to reach the initial position X by continuing to increase the target angular position TTA at a constant speed. In the driving process, the CPU 201 drives the electric motor 70 at the constant speed such that the target angular position TTA reaches the initial position X.

Figure 4:
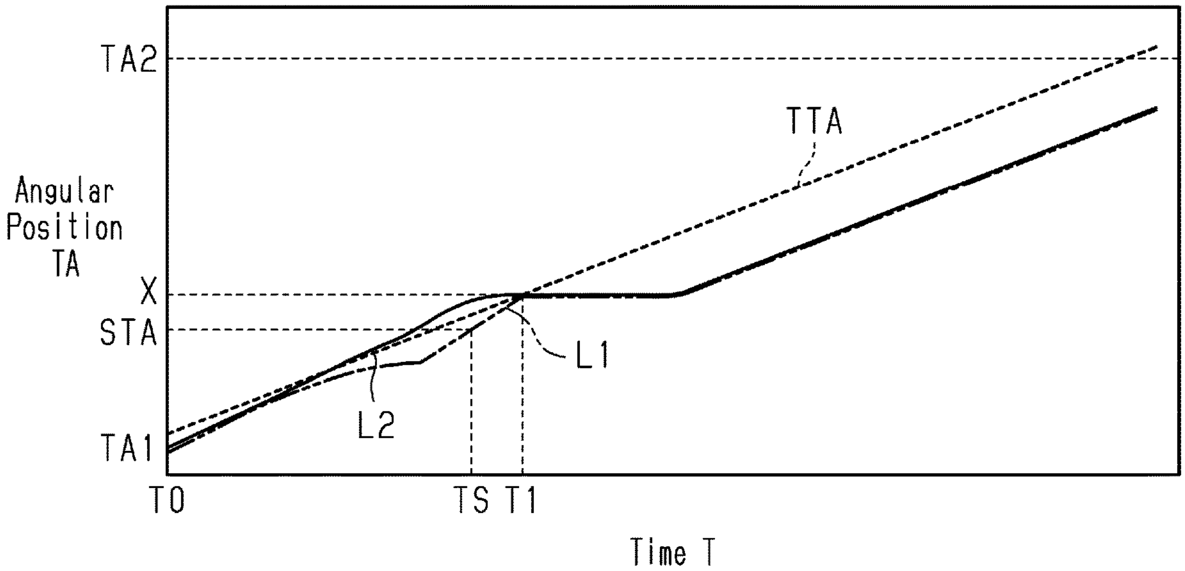
FIG. 4 is a graph showing the angular position with respect to time during the execution of the driving process illustrated in FIG. 3.

Specifically, as shown in FIG. 4, the CPU 201 drives the electric motor 70 such that the angular position TA becomes a first position TA1. The first position TA1 is separated from the initial position X to be smaller by a predetermined constant angle. Next, the CPU 201 drives the electric motor 70 at a constant speed such that the target angular position TTA reaches a second position TA2. The second position TA2 is separated from the initial position X to be larger by a predetermined constant angle. Accordingly, the target angular position TTA reaches the initial position X from the first position TA1 and then reaches the second position TA2. In the present embodiment, the specific angular position is the first position TA1. Further, a specific range SA is the range of the angular position TA from the first position TA1 to the initial position X. In FIG. 4, a long dashed double-short dashed line L1 indicates a case in which wear has not occurred on the gear mechanism 50, and a solid line L2 indicates a case in which wear has occurred on the gear mechanism 50.

The CPU 201 stores, in the memory device 204, time-series data of the angular position TA in which the target angular position TTA of the specific gear SG changes from the first position TA1 to the second position TA2. The constant speed permits, for example, a change in the speed due to errors that occur during control. Then, as shown in FIG. 3, the CPU 201 advances the process to step S12.

In step S12, the CPU 201 executes a change amount calculation process that changes the absolute value AV of a unit change amount ΔTA obtained when the angular position TA becomes a target angular position STA. First, as shown in FIG. 4, the CPU 201 performs fitting for the time-series data of the angular position TA stored in the memory device 204 such that the data can be expressed by a function.

Then, the CPU 201 differentiates the fitted function with respect to time T. The differentiated value at each time T is the unit change amount ΔTA, which is the change amount of the angular position TA per unit time in which the unit time is an infinitesimal number.

Subsequently, the CPU 201 calculates the unit change amount ΔTA at time TS at which the angular position TA becomes the target angular position STA. As shown in FIG. 4, the target angular position STA is the angular position TA within the specific range SA and is the angular position TA separated from the initial position X by a predetermined angle. The target angular position STA is defined in advance as follows through examinations and simulations based on a prior condition in which wear has not occurred on the specific gear SG. One of the teeth of the specific gear SG that is in contact with another gear immediately before the angular position TA reaches the initial position X is identified. Then, the target angular position STA is defined within the range of the angular position TA at which the identified tooth is in contact with the gear. That is, the interval between the target angular position STA and the initial position X is smaller than that between the first position TA1 and the initial position X, and the interval between the target angular position STA and the first position TA1 is smaller than that between the initial position X and the first position TA1. In other words, the target angular position STA is closer to the initial position X than the first position TA1 and is closer to the first position TA1 than the initial position X.

The CPU 201 obtains the absolute value AV of the calculated unit change amount ΔTA at time TS. In the present embodiment, the unit change amount ΔTA is a positive value. Thus, the value of the unit change amount ΔTA is used as the absolute value AV of the unit change amount ΔTA. Then, as shown in FIG. 3, the CPU 201 advances the process to step S13.

In step S13, the CPU 201 executes a determination process that determines whether wear has occurred on the gear mechanism 50 based on a parameter related to a change speed of the angular position TA in the specific range SA during the driving process. In the present embodiment, the parameter related to the change speed of the angular position TA is the unit change amount ΔTA. The CPU 201 determines whether wear has occurred on the gear mechanism 50 when the absolute value AV of the unit change amount ΔTA at time TS calculated in the change amount calculation process of step S12 is less than a predetermined threshold value TH. Specifically, when the absolute value AV of the unit change amount ΔTA at time TS is less than the threshold value TH, the CPU 201 determines that wear has occurred on the gear mechanism 50. When the absolute value AV of the unit change amount ΔTA at time TS is greater than or equal to the threshold value TH, the CPU 201 determines that wear has not occurred on the gear mechanism 50. The threshold value TH is defined in advance through examinations and simulations. Specifically, the CPU 201 measures the unit change amount ΔTA at time TS obtained during the execution of the driving process in a state in which a predetermined amount of wear has occurred on the gear mechanism 50. Then, the CPU 201 defines the threshold value TH based on the absolute value AV of the measured unit change amount ΔTA. The threshold value TH is smaller than the unit change amount ΔTA at time TS at which wear would have not occurred on the gear mechanism 50.

When determining that wear has not occurred on the gear mechanism 50 (S13: NO), the CPU 201 ends the process of the gear wear determination program P2. When determining that wear has occurred on the gear mechanism 50 (S13: YES), the CPU 201 advances the process to the step S14.

In step S14, the CPU 201 executes a warning process. In the warning process, the CPU 201 outputs a warning signal by operating a predetermined hardware. The predetermined hardware is, for example, a warning lamp that indicates that wear has occurred on the gear mechanism 50. The CPU 201 turns on the warning lamp. Then, the CPU 201 ends the process of the gear wear determination program P2.

Operation of First Embodiment

Figure 5:
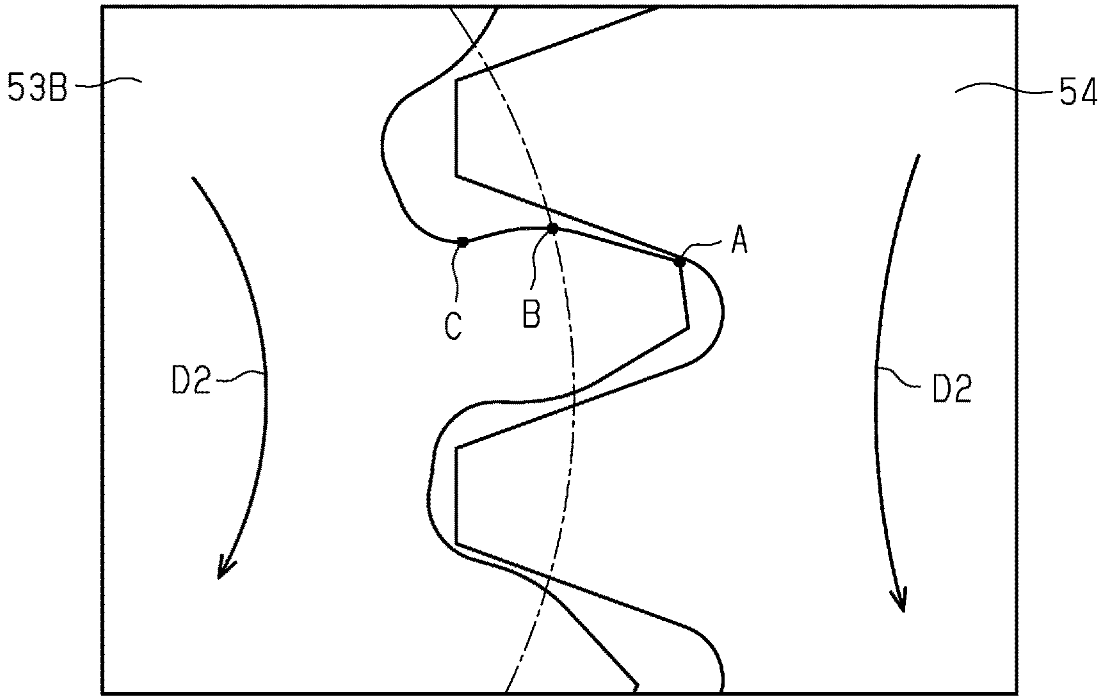
FIG. 5 is a schematic diagram of a state in which the second driven gear serving as a throttle gear and the first driven gear serving as an intermediate gear shown in FIG. 2 mesh with each other.
Figure 6:
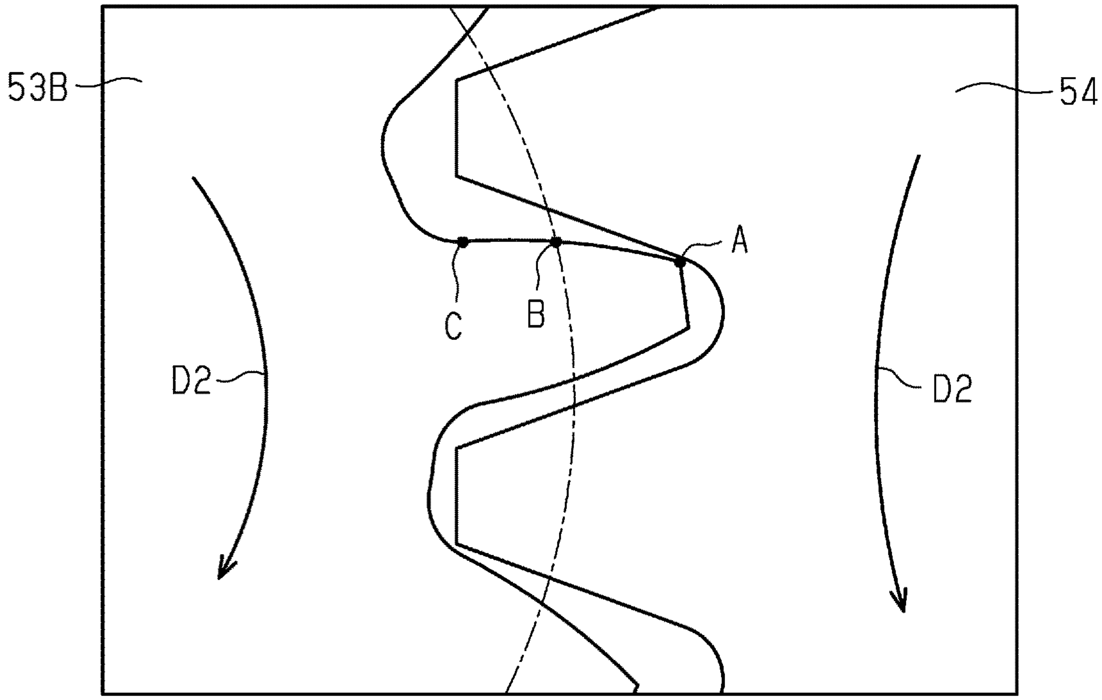
FIG. 6 is a schematic diagram of a state in which the second driven gear serving as the throttle gear and the first driven gear serving as the intermediate gear shown in FIG. 2 mesh with each other.

The state in which the teeth of the second driven gear 54 are in contact with the teeth of the small-diameter gear 53B during the execution of the driving process will now be described with reference to FIGS. 4 to 6. The rotation direction of the second driven gear 54 when rotating such that the angular position TA becomes smaller is referred to as a first rotation direction. The rotation direction of the second driven gear 54 when rotating such that the angular position TA becomes larger is referred to as a second rotation direction D2. As shown in FIG. 5, the teeth of the second driven gear 54 each include an advancing-side surface in the second rotation direction D2 and a trailing-side surface in the second rotation direction D2. In the teeth of the second driven gear 54, the advancing-side surfaces in the second rotation direction D2 are lower surfaces of the teeth in FIG. 5. In the teeth of the second driven gear 54, the trailing-side surfaces in the second rotation direction D2 are upper surfaces of the teeth in FIG. 5.

As shown in FIG. 4, the time T at which the angular position TA of the second driven gear 54 reaches the first position TA1 is referred to as a start time T0. The angular position TA is smaller than the initial position X from the start time T0 to a point before a first time T1. When the angular position TA is smaller than the initial position X, the second driven gear 54 receives torque acting in the second rotation direction D2 from the first spring 27. This causes the first driven gear 53 to contact the advancing-side surface of the second driven gear 54 in the second rotation direction D2 (the lower surface in FIG. 5) as shown in FIG. 5.

At the first time T1, the angular position TA reaches the initial position X as shown in FIG. 4. At the first time T1, the second driven gear 54 stops receiving the torque acting in the second rotation direction D2 from the first spring 27. As the target angular position TTA increases, the small-diameter gear 53B rotates in the second rotation direction D2. Thus, the small-diameter gear 53B is separated from the advancing-side surface of the second driven gear 54 in the second rotation direction D2. This results in a state in which the small-diameter gear 53B is rotating and the second driven gear 54 is not rotating.

There is a case in which wear has not occurred on the teeth of the small-diameter gear 53B meshing with the second driven gear 54 (specific gear SG). There is also a case in which wear has occurred on the teeth of the small-diameter gear 53B. The state in which the teeth of the second driven gear 54 are in contact with the teeth of the small-diameter gear 53B in these cases will now be described.

FIG. 5 shows the case in which wear has not occurred on the teeth of the small-diameter gear 53B. In this case, as viewed in a direction along the support shaft 52, the surface of a tooth of the small-diameter gear 53B has a middle point B. The middle point B projects from a virtual straight line that connects between the tip A of the tooth and the root C of the tooth.

If the surface of the advancing-side tooth of the second driven gear 54 in the second rotation direction D2 is in contact with the small-diameter gear 53B, the second driven gear 54 rotates such that the small-diameter gear 53B contacts the tip A, the middle point B, and the root C of the surface of the tooth of the small-diameter gear 53B in this order. When the contact point of the second driven gear 54 and the small-diameter gear 53B goes beyond the middle point B, the second driven gear 54 starts rotating more rapidly than before.

The case in which wear has occurred on the tooth of the small-diameter gear 53B will now be described. In this case, as viewed in the direction along the support shaft 52, the middle point B on the surface of the tooth of the small-diameter gear 53B is located closer to the virtual straight line connecting between the tip A and the root C than when wear has not occurred.

If the surface of the advancing-side tooth of the second driven gear 54 in the second rotation direction D2 collides with the surface of the tooth of the small-diameter gear 53B, the second driven gear 54 rotates such that the small-diameter gear 53B contacts the tip A, the middle point B, and the root C of the surface of the tooth of the small-diameter gear 53B in this order. In the case of FIG. 6, when the contact point of the second driven gear 54 and the small-diameter gear 53B goes beyond the middle point B, the second driven gear 54 starts rotating slower than in the case of FIG. 5, in which wear has not occurred on the small-diameter gear 53B. Thus, as compared to when wear has not occurred on the small-diameter gear 53B, the angular position TA of the second driven gear 54 changes slower. In other words, as the wear on the small-diameter gear 53B becomes larger, the angular position TA of the second driven gear 54 changes slower when the contact point goes beyond the middle point B.

In the above example, wear has occurred on a portion near the middle point B of the tooth of the small-diameter gear 53B. The same phenomenon occurs in a case in which wear has occurred on a portion near the tip A of the tooth of the small-diameter gear 53B. Thus, when wear occurs on the small-diameter gear 53B, the angular position TA of the second driven gear 54 changes slower regardless of the shape of the small-diameter gear 53B.

Advantages of First Embodiment (1-1) In the first embodiment, the controller 200 refers to a change in the absolute value AV of the unit change amount ΔTA to detect an increase in the gap between the gears from the electric motor 70 to the second driven gear 54 (specific gear SG). For example, in the examples described as the operation of the embodiment in FIGS. 4 to 6, focus is placed on the gap between the tooth of the second driven gear 54 and the middle point B of the tooth of the small-diameter gear 53B created immediately before the angular position TA of the second driven gear 54 reaches the initial position X. The increase in the gap is detected from a decrease in the absolute value AV of the unit change amount ΔTA. The increase in the gap is substantially directly reflected on the progress of the wear on the gears. Accordingly, the series of processes of the first embodiment allow the controller 200 to accurately determine that wear has occurred on the gear mechanism 50.

(1-2) In the first embodiment, the specific gear SG is the second driven gear 54, which rotates integrally with the driven shaft 22. This allows the sensor that obtains the open degree of the throttle valve 23 to be used as the rotation sensor 60, which determines that wear has occurred on the gear mechanism 50. This eliminates the need for a new sensor dedicated for detecting the angular position TA of the specific gear SG.

Additionally, in the first embodiment, the second driven gear 54 (specific gear SG) is located on the most downstream side of the torque transmission path from the electric motor 70 to the driven shaft 22. Thus, when wear occurs on any of the gears of the gear mechanism 50, the determination process accurately determines that the wear has occurred on the gear mechanism 50.

(1-3) In the first embodiment, the first driven gear 53 and the second driven gear 54 are made of synthetic resin. Thus, wear tends to occur in the first driven gear 53, which is located between the specific gear SG and the electric motor 70, and the second driven gear 54 (specific gear SG). In the above embodiment, the angular position TA of the second driven gear 54 is detected. Thus, wear that has occurred on the first driven gear 53 and the second driven gear 54 of the gear mechanism 50, which become easily worn, can be detected.

(1-4) In the first embodiment, the CPU 201 executes the warning process to output a warning signal. Operating the warning lamp based on the warning signal notifies a user or the like that wear has occurred on the gear mechanism 50.

(1-5) In the first embodiment, the CPU 201 executes the determination process using the unit change amount ΔTA at time TS at which the angular position TA becomes the target angular position STA. Thus, when a portion to become worn is predictable from the shape or the like of the specific gear SG, the wear on the gear mechanism 50 can be readily detected without using excessively complicated processes.

A throttle control system according to a second embodiment will now be described with reference to FIG. 7. Those components that are the same as the corresponding components of the first embodiment will be described simply or will not be described. The second embodiment is different from the first embodiment in part of the processes executed during the execution of the gear wear determination program P2. The difference will be mainly described below.

Series of Processes that Determine Wear on Gear Mechanism

In the second embodiment, when obtaining the stop request R2, the CPU 201 executes the gear wear determination program P2 once.

Figure 7:
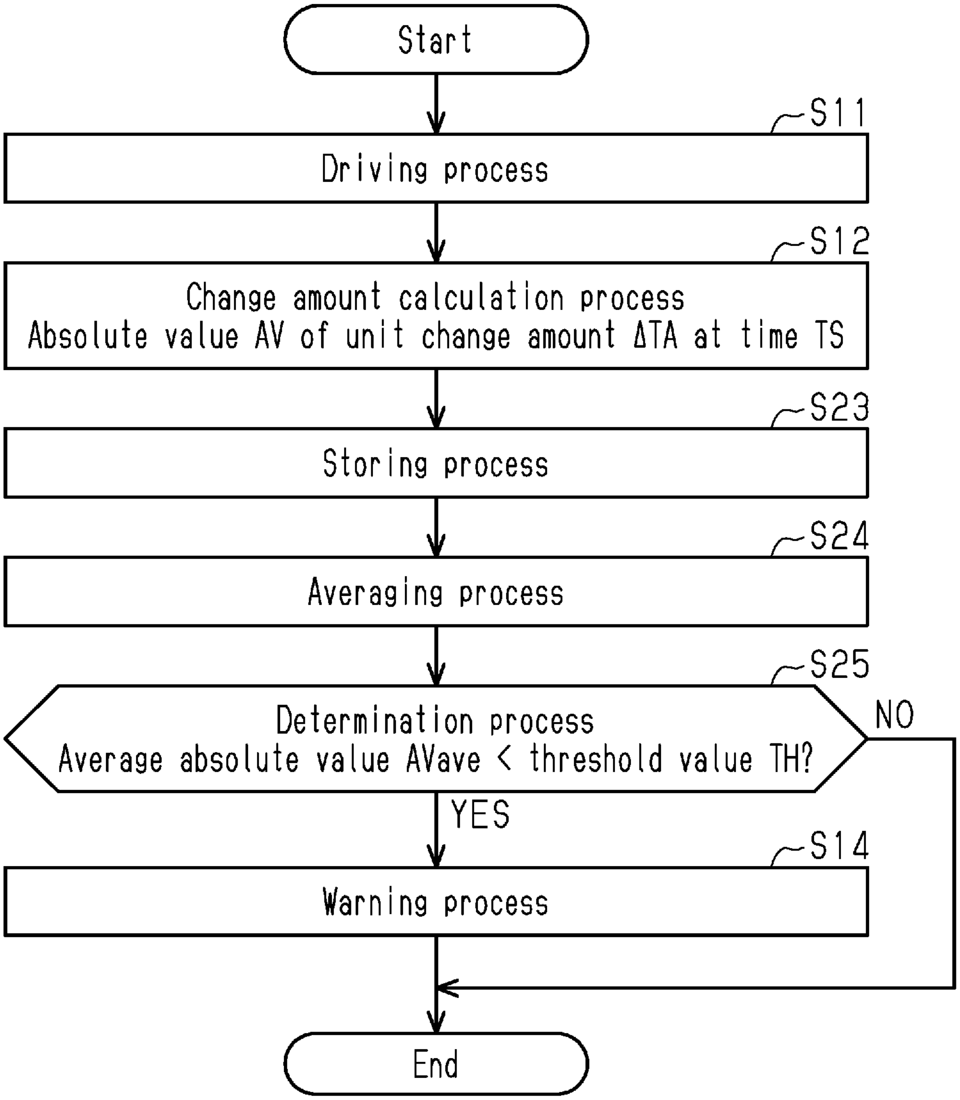
FIG. 7 is a flowchart illustrating a series of processes that determine wear on the gear mechanism in a second embodiment, instead of FIG. 3.

As shown in FIG. 7, after starting the gear wear determination program P2, the CPU 201 first executes the process of step S11. The driving process in step S11 of the second embodiment is the same as that in the first embodiment. After executing the driving process, as shown in FIG. 7, the CPU 201 advances the process to step S12.

In step S12, the CPU 201 calculates the absolute value AV of the calculated unit change amount ΔTA at time TS. The change amount calculation process of the second embodiment is the same as that of the first embodiment. After executing the change amount calculation process, the CPU 201 advances the process to step S23.

In step S23, the CPU 201 executes a storing process. The storing process is a process that stores a predetermined number of the absolute values AV of the unit change amount ΔTA at time TS calculated in step S12. The absolute values AV are updated to be included sequentially from newer ones of the absolute values AV. Specifically, the CPU 201 updates the data corresponding to the absolute values AV of the unit change amount ΔTA at time TS stored in the memory device 204. First, the CPU 201 stores, as the newest one, the absolute value AV of the unit change amount ΔTA at time TS calculated in the preceding change amount calculation process. Of the data corresponding to the absolute values AV of the unit change amount ΔTA at time TS stored in the last storing process, the CPU 201 then updates each datum as an older version, excluding the oldest datum. In this manner, the CPU 201 stores the data corresponding to the absolute values AV of the unit change amount ΔTA at time TS sequentially from newer ones in the memory device 204. Subsequently, the CPU 201 advances the process to step S24. The predetermined number is, for example, twenty-five.

In step S24, the CPU 201 executes an averaging process. That is, the CPU 201 calculates an average absolute value AVave. The average absolute value AVave is the average value of the absolute values AV of the unit change amount ΔTA at time TS stored in step S23. The average absolute value AVave is an arithmetic mean of the absolute values AV of the unit change amount ΔTA at time TS. When the number of the stored absolute values AV of the unit change amount ΔTA at time TS is not greater than the above predetermined number, the value of the arithmetic mean of all the stored absolute values AV of the unit change amount ΔTA at time TS is set as the average absolute value AVave. Subsequently, the CPU 201 advances the process to step S25.

In step S25, the CPU 201 executes the determination process, which determines whether wear has occurred on the gear mechanism 50. The CPU 201 determines whether wear has occurred on the gear mechanism 50 by comparing the threshold value TH with the average absolute value AVave, which was calculated in the averaging process of step S24. Specifically, when the average absolute value AVave is less than the threshold value TH, the CPU 201 determines that wear has occurred on the gear mechanism 50. When the average absolute value AVave is greater than or equal to the threshold value TH, the CPU 201 determines that wear has not occurred on the gear mechanism 50. When the average absolute value AVave is less than the threshold value TH, at least part of the absolute values AV of the unit change amount ΔTA at time TS is less than the threshold value TH. That is, the determination that the average absolute value AVave is less than the threshold value TH is made when the absolute value AV of the unit change amount ΔTA at time TS is less than the threshold value TH.

When determining that wear has not occurred on the gear mechanism 50 (S25: NO), the CPU 201 ends the process of the gear wear determination program P2. When determining that wear has occurred on the gear mechanism 50 (S25: YES), the CPU 201 advances the process to the step S14. The warning process in step S14 of the second embodiment is the same as that in the first embodiment. After executing the warning process, the CPU 201 ends the process of the gear wear determination program P2.

Advantage of Second Embodiment (2-1) In the second embodiment, the controller 200 determines that wear has occurred on the gear mechanism 50 when the average absolute value AVave, which is the average value of the absolute values AV of the unit change amount ΔTA at time TS, is less than the threshold value TH. Thus, as compared to the case of determining that wear has occurred on the gear mechanism 50 when one absolute value AV of the unit change amount ΔTA is less than the threshold value TH, the variations in each of the absolute values AV of the unit change amount ΔTA at time TS have a smaller influence on one driving process.

A throttle control system according to a third embodiment will now be described with reference to FIGS. 8 and 9. Those components that are the same as the corresponding components of the first embodiment will be described simply or will not be described. The third embodiment is different from the first embodiment in part of the processes executed during the execution of the gear wear determination program P2. The difference will be mainly described below.

Series of Processes that Determine Wear on Gear Mechanism

In the third embodiment, when obtaining the stop request R2, the CPU 201 executes the gear wear determination program P2 once.

Figure 8:
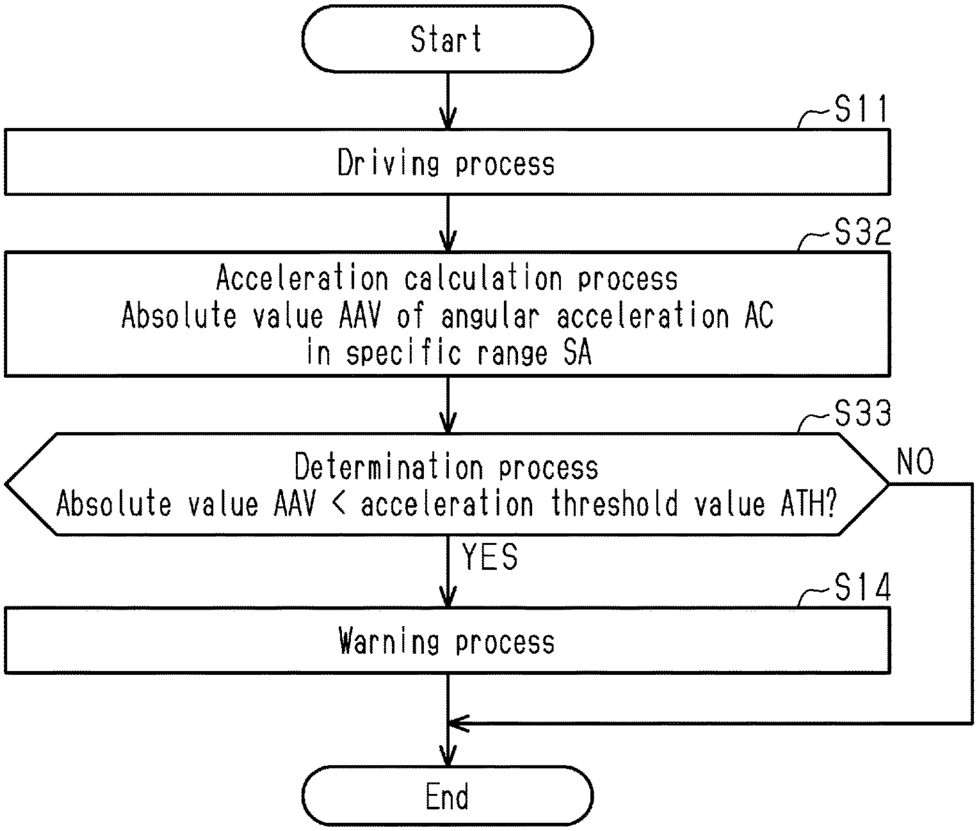
FIG. 8 is a flowchart illustrating a series of processes that determine wear on the gear mechanism in a third embodiment, instead of FIG. 3.

As shown in FIG. 8, after starting the gear wear determination program P2, the CPU 201 first executes the process of step S11. The driving process in step S11 of the third embodiment is the same as that in the first embodiment. After executing the driving process, as shown in FIG. 8, the CPU 201 advances the process to step S32.

In step S32, the CPU 201 calculates an acceleration calculation process that calculates an angular acceleration AC. The angular acceleration AC is the acceleration at the angular position TA in the specific range SA. In the acceleration calculation process, the CPU 201 first performs fitting for the time-series data of the angular position TA stored in the memory device 204 such that the data can be expressed by a function.

Figure 9:
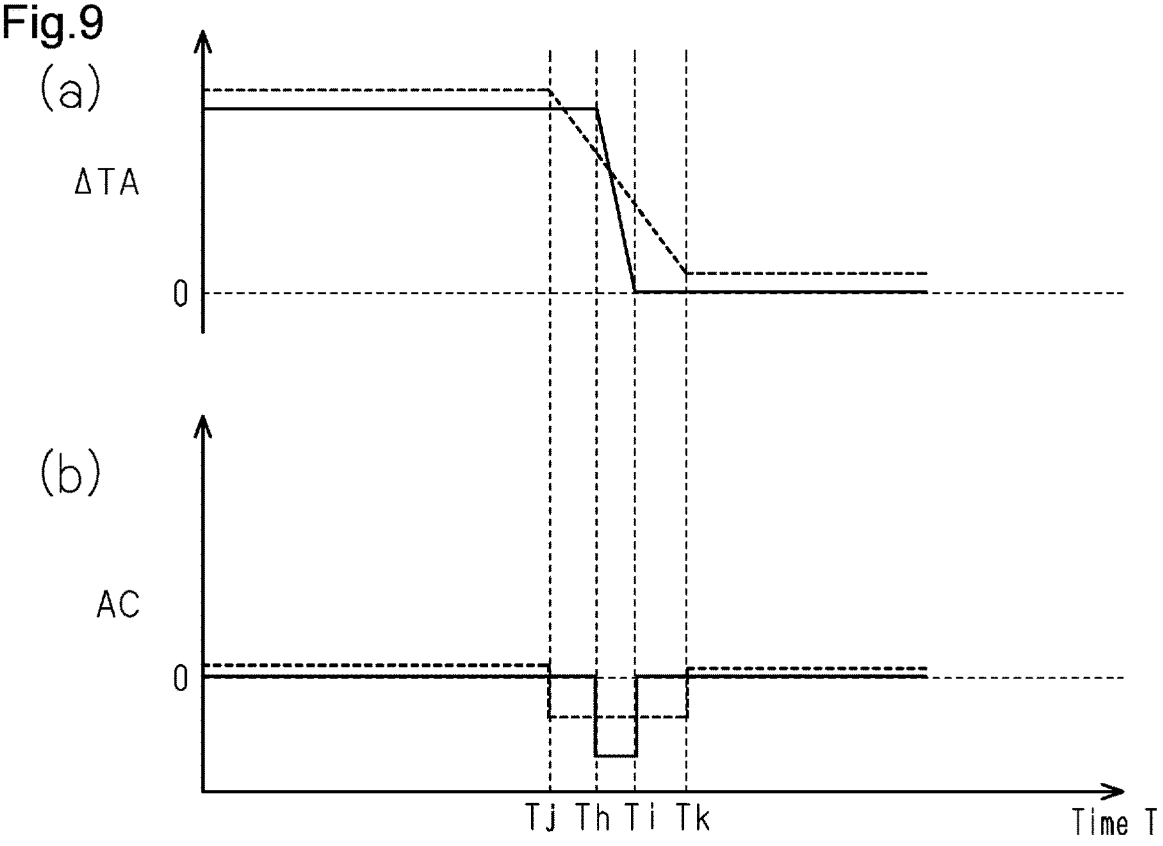
In FIG. 9, section (a) is a timing diagram illustrating the unit change amount in the third embodiment shown in FIG. 8, and section (b) is a timing diagram illustrating the angular acceleration in the third embodiment shown in FIG. 8.

Then, as shown by section (b) of FIG. 9, the CPU 201 performs second-order differentiation for the fitted time with respect to time T. The second-order differentiated value at each time T is the angular acceleration AC, which is an acceleration amount at the angular position TA per unit time in which the unit time is an infinitesimal number. In other words, the angular acceleration AC is a change rate of the change speed of the angular position TA per unit time. In the third embodiment, the parameter related to the change speed of the angular position TA is the angular acceleration AC.

Subsequently, the CPU 201 calculates the maximum value of the absolute value AAV of the angular acceleration AC in the specific range SA. That is, the CPU 201 calculates the maximum value of the absolute value AAV of the angular acceleration AC at time T at which the angular position TA changes at the highest speed in the angular position TA from the first position TA1 to the initial position X. Next, the CPU 201 advances the process to step S33.

In step S33, the CPU 201 executes the determination process, which determines whether wear has occurred on the gear mechanism 50, based on the angular acceleration AC in the specific range SA. The CPU 201 determines whether the maximum value of the absolute value AAV of the angular acceleration AC, which was calculated in the acceleration calculation process in step S32, is less than a predetermined acceleration threshold value ATH. When the maximum value of the absolute value AAV of the angular acceleration AC is less than the acceleration threshold value ATH, the CPU 201 determines that wear has occurred on the gear mechanism 50. That is, the determination process is a process in which the CPU 201 determines that wear has occurred on the gear mechanism 50 based on the angular acceleration AC, which is the parameter related to the change speed of the angular position TA in the specific range SA.

Specifically, when the maximum value of the absolute value AAV of the angular acceleration AC in the specific range SA is less than the acceleration threshold value ATH, the CPU 201 determines that wear has occurred on the gear mechanism 50. When the maximum value of the absolute value AAV of the angular acceleration AC in the specific range SA is greater than or equal to the acceleration threshold value ATH, the CPU 201 determines that wear has not occurred on the gear mechanism 50. The acceleration threshold value ATH is defined in advance through examinations and simulations. Specifically, the CPU 201 measures the angular acceleration AC obtained during the execution of the driving process in a state in which a predetermined amount of wear has occurred on the gear mechanism 50. Then, the CPU 201 sets the acceleration threshold value ATH based on the absolute value AAV of the measured angular acceleration AC. The acceleration threshold value ATH is smaller than the maximum value of the absolute value AAV of the angular acceleration AC in the specific range SA in a case in which wear would have not occurred on the gear mechanism 50.

When determining that wear has not occurred on the gear mechanism 50 (S33: NO), the CPU 201 ends the process of the gear wear determination program P2. When determining that wear has occurred on the gear mechanism 50 (S33: YES), the CPU 201 advances the process to the step S14.

In step S14, the CPU 201 executes the warning process. In the warning process, the CPU 201 outputs a warning signal by operating the predetermined hardware. The predetermined hardware is, for example, a warning lamp that indicates that wear has occurred on the gear mechanism 50. The CPU 201 turns on the warning lamp. Then, the CPU 201 ends the process of the gear wear determination program P2.

Operation of Third Embodiment

When wear occurs on the specific gear SG of the gear mechanism 50, the wear may occur at a different portion depending on an individual of the specific gear SG. When wear progresses, the unit change amount ΔTA may change to the greatest extent at an angular position TA which is different from the target angular position STA. Thus, it may be difficult to determine the target angular position STA in advance.

In FIG. 9, the solid line indicates the case in which wear has not occurred on the gear mechanism 50, and the broken line indicates the case in which wear has occurred on the gear mechanism 50. For example, in the case in which wear has not occurred on the specific gear SG, the unit change amount ΔTA in the specific range SA continues to decrease until time T1, which is later than time Th by a certain amount of time, as graphically shown by the solid line in section (a) of FIG. 9. Thus, in the case in which wear has not occurred on the specific gear SG, the angular acceleration AC is negative and its absolute value is relatively large from time Th to time Ti as graphically shown by the solid line in section (b) of FIG. 9. Accordingly the absolute value of the angular acceleration AC in this case is relatively large.

In the case in which wear has occurred on the specific gear SG, the unit change amount ΔTA in the specific range SA starts decreasing at time Tj, which is earlier than time Th, as graphically shown by the broken line in section (a) of FIG. 9. Further, the unit change amount ΔTA in this case continues to decrease until time Tk, which is later than time Ti. Thus, as graphically shown by the solid line in section (b) of FIG. 9, in the case in which wear has occurred on the specific gear SG, the angular acceleration AC is negative and its absolute value is smaller than in the case in which wear has not occurred on the specific gear SG from time Th to time Ti. Thus, the absolute value AV of the angular acceleration AC in this case is smaller than that obtained in the case in which wear has not occurred on the specific gear SG. In such a manner, in FIG. 9, the broken line indicates the case in which wear has not occurred on the gear mechanism 50, and the broken line indicates the case in which wear has occurred on the gear mechanism 50.

In the example of FIG. 9, if the maximum value of the absolute value AV of the angular acceleration AC in a time range corresponding to the specific range SA can be obtained, whether wear has occurred on the gear mechanism 50 is detected. This eliminates the need to pre-define the time TS at which the angular position TA becomes the target angular position STA.

Advantage of Third Embodiment (3-1) In the third embodiment, the CPU 201 executes the determination process by calculating the maximum value of the absolute value AAV of the angular acceleration AC, which is a differentiated value of the change speed of the angular position TA. The third embodiment is different from the first and second embodiments in that wear on the gear mechanism 50 can be determined even if the target angular position STA is not pre-defined. Thus, even if a different error occurs in each individual of the gear mechanism 50 and the wear on the gear mechanism 50 varies the angular position at which the largest change occurs in the unit change amount ΔTA, the wear on the gear mechanism 50 can be determined more accurately.

A throttle control system according to a fourth embodiment will now be described with reference to FIG. 10. Those components that are the same as the corresponding components of the first to third embodiments will be described simply or will not be described. The fourth embodiment is different from the third embodiment in part of the processes executed during the execution of the gear wear determination program P2. The difference will be mainly described below.

Series of Processes that Determine Wear on Gear Mechanism

In the fourth embodiment, when obtaining the stop request R2, the CPU 201 executes the gear wear determination program P2 once.

Figure 10:
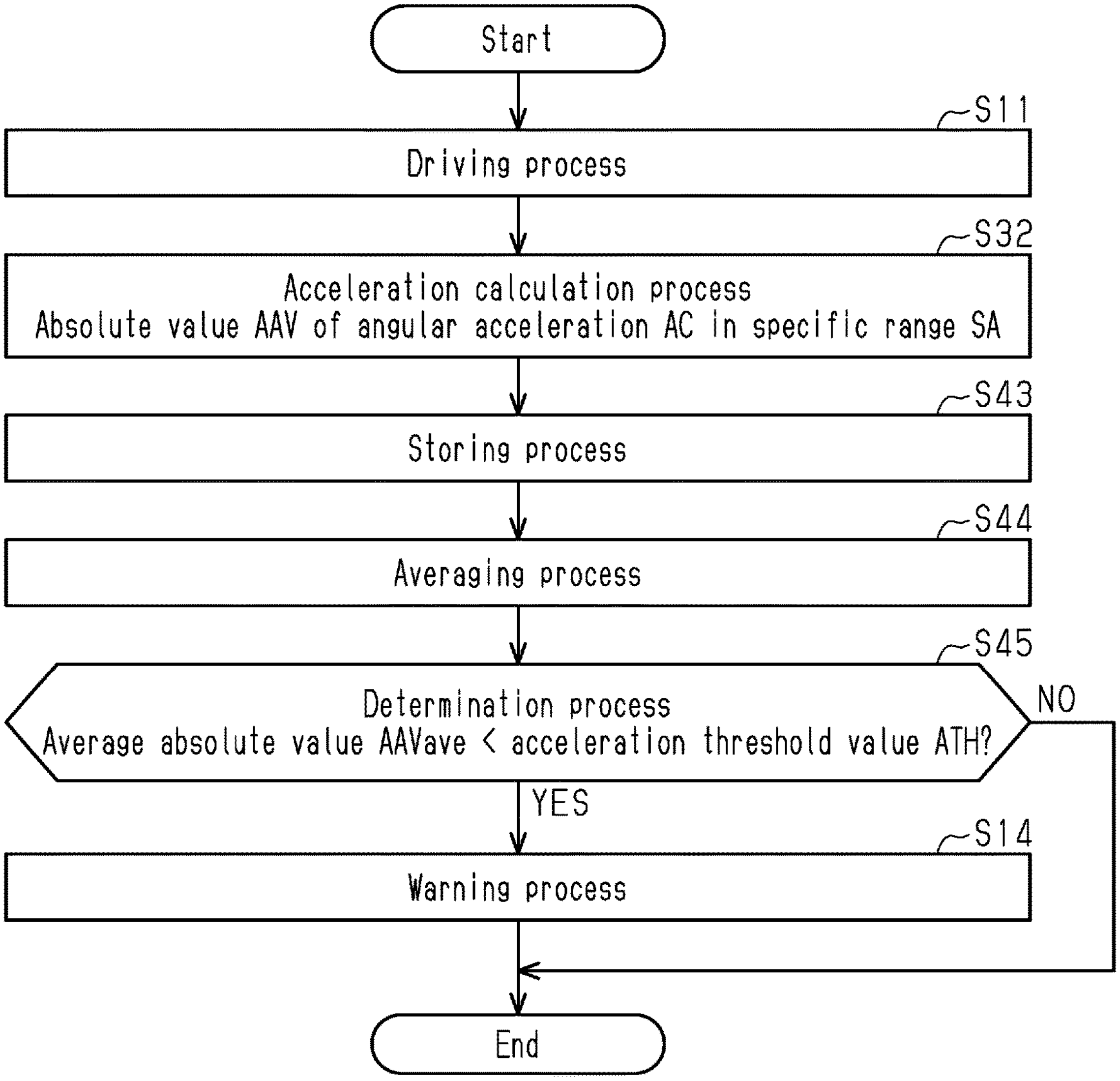
FIG. 10 is a flowchart illustrating a series of processes that determine wear on the gear mechanism in a fourth embodiment, instead of FIG. 8.

As shown in FIG. 10, after starting the gear wear determination program P2, the CPU 201 first executes the process of step S11. The driving process in step S11 of the fourth embodiment is the same as that in the first embodiment. After executing the driving process, the CPU 201 advances the process to step S32.

In step S32, the CPU 201 executes the acceleration calculation process. The acceleration calculation process of the fourth embodiment is the same as that of the third embodiment. After executing the acceleration calculation process, the CPU 201 advances the process to step S43.

In step S43, the CPU 201 executes a storing process. The storing process is a process that stores a predetermined number of the maximum values of the absolute value AAV of the angular acceleration AC in the specific range SA, which was calculated in step S32. The maximum values are updated to be included sequentially from newer ones of the maximum values. Specifically, the CPU 201 updates the data corresponding to the maximum values of the absolute value AAV of the angular acceleration AC in the specific range SA stored in the memory device 204. First, the CPU 201 stores, as the newest one, the maximum value of the absolute value AAV of the angular acceleration AC in the specific range SA that was calculated in the preceding change amount calculation process. Of the data corresponding to the maximum values of the absolute value AAV of the angular acceleration AC in the specific range SA stored in the last storing process, the CPU 201 then updates each datum as an older version, excluding the oldest datum. The CPU 201 thus stores the data corresponding to the maximum values of the absolute value AAV of the angular acceleration AC in the specific range SA sequentially from newer ones in the memory device 204. Subsequently, the CPU 201 advances the process to step S44. The predetermined number is, for example, twenty-five.

In step S44, the CPU 201 executes an averaging process. That is, the CPU 201 calculates an average absolute value AAVave. The average absolute value AAVave is the average value of the maximum values of the absolute value AAV of the angular acceleration AC in the specific range SA stored in step S43. The average absolute value AAVave is an arithmetic mean of the maximum values of the absolute value AAV of the angular acceleration AC in the specific range SA. When the number of the stored maximum values of the angular acceleration AC is not greater than the above predetermined number, the value of the arithmetic mean of all the stored maximum values of the absolute value AAV of the angular acceleration AC in the specific range SA is set as the average absolute value AAVave. Subsequently, the CPU 201 advances the process to step S45.

In step S45, the CPU 201 executes the determination process, which determines whether wear has occurred on the gear mechanism 50, based on the angular acceleration AC in the specific range SA. The CPU 201 determines whether wear has occurred on the gear mechanism 50 by comparing the acceleration threshold value ATH with the average absolute value AAVave, which was calculated in the averaging process of step S44. Specifically, when the average absolute value AAVave is less than the acceleration threshold value ATH, the CPU 201 determines that wear has occurred on the gear mechanism 50. When the average absolute value AAVave is greater than or equal to the acceleration threshold value ATH, the CPU 201 determines that wear has not occurred on the gear mechanism 50. When the average absolute value AAVave is less than the acceleration threshold value ATH, at least part of the absolute values AAV of the angular acceleration AC at time TS is less than the acceleration threshold value ATH. That is, the determination that the average absolute value AAVave is less than the acceleration threshold value ATH is made when the maximum value of the absolute values AAV of the angular acceleration AC in the specific range SA is less than the acceleration threshold value ATH.

When determining that wear has not occurred on the gear mechanism 50 (S45: NO), the CPU 201 ends the process of the gear wear determination program P2. When determining that wear has occurred on the gear mechanism 50 (S45: YES), the CPU 201 advances the process to the step S14. The warning process in step S14 of the fourth embodiment is the same as that in the first embodiment. After executing the warning process, the CPU 201 ends the process of the gear wear determination program P2.

Advantage of Fourth Embodiment (4-1) In the fourth embodiment, the controller 200 determines that wear has occurred on the gear mechanism 50 when the average absolute value AAVave, which is the average value of the maximum values of the absolute value AAV of the angular acceleration AC in the specific range SA, is less than the acceleration threshold value ATH. Thus, as compared to the case of determining that wear has occurred on the gear mechanism 50 when one maximum value of the absolute value AAV of the angular acceleration AC is less than the acceleration threshold value ATH, the variations in each absolute value AAV of the angular acceleration AC have a smaller influence on one driving process.

Modifications

The above embodiments may be modified as follows. The above embodiments and the following modifications may be implemented in combination with each other as long as technical contradiction does not occur.

The valve mechanism 20 is not limited to the example of each of the above embodiments. For example, the housing 21 does not have to define the motor accommodation space 21B, and the valve mechanism 20 may include another housing that defines the motor accommodation space 21B.

The spring mechanism 25 only needs to bias the specific gear SG such that the angular position TA of the specific gear SG becomes the initial position X when the specific gear SG does not receive torque from the electric motor 70 or the driven shaft 22. For example, another member may be disposed between the first spring 27 and the joint 26, or the first spring 27 may bias the first driven gear 53.

The number of the gears included in the gear mechanism 50 may be two, or may be four or more.

The material of each gear of the gear mechanism 50 is not limited to the example of each of the above embodiments. For example, the first driven gear 53 and the second driven gear 54 may be made of metal (e.g., carbon steel or stainless steel). One or more of the gears selected from the specific gear SG and a gear that is located between the specific gear SG and the electric motor 70 on the transmission path for torque from the electric motor 70 to the driven shaft 22 may be made of synthetic resin. In this case, the gears made of synthetic resin, which is relatively likely to become worn, may be included in the gears on which wear can be determined from the absolute value AV of the unit change amount ΔTA.

The specific gear SG is not limited to the second driven gear 54. The specific gear SG may be the first driven gear 53 or may be the driving gear 51. In this case, the throttle control system only needs to include a sensor that obtains the angular position TA of the specific gear SG as the rotation sensor 60.

The controller 200 may be control circuitry including one or more processors that execute various processes in accordance with a computer program (i.e., software). The controller 200 may be circuitry including one or more dedicated hardware circuits such as application specific integrated circuits (ASICs) that execute at least part of various processes or including a combination thereof. The processor includes a CPU and memories, such as a RAM and a ROM. The memory stores program codes or instructions configured to cause the CPU to execute the processes. The memory, or a non-transitory computer-readable medium, includes any type of media that are accessible by general-purpose computers and dedicated computers.

The CPU 201 may notify the user that wear has occurred on the gear mechanism 50 by performing another operation (i.e., by using another predetermined hardware) based on a warning signal. For example, when obtaining the warning signal, the CPU 201 may notify a display (predetermined hardware) on the vehicle 500 of a message indicating that the gear mechanism 50 needs to be replaced. Alternatively, for example, when obtaining the warning signal, the CPU 201 may notify a smartphone communicating with the vehicle 500 of a message indicating that the gear mechanism 50 needs to be replaced. As another option, the CPU 201 does not need to execute the warning process.

In the driving process, the CPU 201 may cause the target angular position TTA of the specific gear SG to reach the initial position X by continuing to decrease the target angular position TTA at the constant speed. For example, the CPU 201 may drive the electric motor 70 at the constant speed such that the target angular position TTA reaches the initial position X from the second position TA2. In this configuration, increases in the gaps between the gears of the gear mechanism 50 can be detected based on how large the absolute value AV of the unit change amount ΔTA is. In this case, the target angular position STA may be set as an angular position TA that is greater than the initial position X by a predetermined angle.

The CPU 201 may calculate the unit change amount ΔTA using another method. For example, the CPU 201 may calculate, as the unit change amount ΔTA at time TS, the change amount of the angular position TA in a predetermined unit time including time TS.

In the second embodiment, when executing the gear wear determination program P2 once, the CPU 201 may repeat step S11 to step S23 a predetermined number of times and then advance the process to step S24. That is, when obtaining the stop request R2 once, the CPU 201 may execute the driving process (S11) and the change amount calculation process (S12) a number of times.

In the first embodiment, when the number of times the absolute value AV of the unit change amount ΔTA at time TS becomes less than the threshold value TH is greater than a predetermined number of times, the CPU 201 may determine that wear has occurred on the gear mechanism 50. For example, when executing the gear wear determination program P2 once, the CPU 201 may repeat step S11 to step S13 a predetermined number of times. Further, in step S13, the CPU 201 may store, in the memory device 204, the number of times the absolute value AV of the unit change amount ΔTA at time TS becomes less than the threshold value TH, for example. Then, by executing the gear wear determination program P2 a number of times, the CPU 201 may determine that wear has occurred on the gear mechanism 50 when the number of times the absolute value AV becomes less than the threshold value TH reaches a predetermined number of times. In this case, the controller 200 determines that wear has occurred on the gear mechanism 50 when the absolute value AV of the unit change amount ΔTA at time TS becomes less than the threshold value TH.

In the second embodiment, when the number of the stored absolute values AV of the unit change amount ΔTA is less than the predetermined number, the CPU 201 does not have to execute the processes of steps S24 to step S14 in FIG. 7. In this modification, when the number of the store absolute values AV is less than the predetermined number, it is not determined whether wear has occurred on the gear mechanism 50. After the number of the store absolute values AV reaches the predetermined number, at least the processes of steps S24 to S25 in FIG. 7 are executed to determine whether wear has occurred on the gear mechanism 50.

The method for defining the target angular position STA may be changed. As described above in relation to FIG. 4, in the case in which wear has occurred on the gear mechanism 50, a gradual change occurs in the angular position TA of the second driven gear 54 immediately before the angular position TA of the second driven gear 54 reaches the initial position X. Thus, when the time-series data of the angular position TA is represented by a function, the differentiated value of the function (i.e., unit change amount ΔTA) decreases in a certain range during which the angular position TA reaches the initial position X. In such a manner, the range of the target angular position STA may change depending on, for example, the method for fitting the time-series data of the angular position TA and the method for calculating the unit change amount ΔTA. Accordingly, the angular position TA at which the unit change amount ΔTA may change depending on whether wear has occurred on the gear mechanism 50 is set to the target angle position STA through, for example, examinations and simulations.

In each of the above embodiments, the CPU 201 only needs to determine whether wear has occurred on the gear mechanism 50 based on the parameter related to the change speed of the angular position TA in the specific range SA during the execution of the driving process. Thus, for example, the CPU 201 may determine that wear has occurred on the gear mechanism 50 when the unit change amount ΔTA at the angular position TA other than the target angular position STA is less than the threshold value TH.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A throttle control system, comprising:

a throttle device; and control circuitry that controls the throttle device, wherein the throttle device includes:

- an electric motor having a driving shaft;
- a gear mechanism having gears, the gear mechanism being driven by rotation of the driving shaft;
- a driven shaft that is rotated by the gear mechanism;
- a throttle valve that is selectively opened and closed by rotation of the driven shaft;
- a rotation sensor that obtains an angular position of a specific gear, the specific gear being one of the gears; and
- a spring mechanism that biases the specific gear such that the angular position becomes a predetermined initial position when the specific gear does not receive torque from the electric motor or the driven shaft, and the control circuitry is configured to execute:

- a driving process that causes a target angular position of the specific gear to reach the initial position by continuing to increase or decrease the target angular position at a constant speed; and
- a determination process that determines that wear has occurred on the gear mechanism based on a parameter related to a change speed of the angular position in a specific range during execution of the driving process, the specific range being a range from a specific angular position to the initial position, and the specific angular position being the angular position that is separated from the initial position by a predetermined constant angle.

2. The throttle control system according to claim 1, wherein the specific gear rotates integrally with the driven shaft.

3. The throttle control system according to claim 1, wherein one or more of the gears selected from the specific gear and a gear that is located between the specific gear and the electric motor on a transmission path for torque from the electric motor to the driven shaft is made of synthetic resin.

4. The throttle control system according to claim 1, wherein the control circuitry is further configured to execute a warning process that outputs a warning signal by operating a predetermined hardware when the determination process determines that wear has occurred on the gear mechanism.

5. The throttle control system according to claim 1, wherein

- a unit change amount is a change amount of the angular position per unit time during the execution of the driving process, a target angular position is the angular position that is predetermined in the specific range, the parameter related to the change speed of the angular position is the unit change amount, and in the determination process, the control circuitry is configured to determine that wear has occurred on the gear mechanism when an absolute value of the unit change amount in a case in which the angular position is the target angular position is less than a predetermined threshold value.

6. The throttle control system according to claim 5, wherein the control circuitry stores a predetermined number of absolute values of the unit change amount at the target angular position, the absolute values being updated to be included sequentially from newer ones of the absolute values each time the driving process is executed, and in the determination process, the control circuitry is configured to determine that wear has occurred on the gear mechanism when an average value of the stored absolute values of the unit change amount is less than the threshold value.

7. The throttle control system according to claim 1, wherein an angular acceleration is an acceleration of the angular position during the execution of the driving process, the parameter related to the change speed of the angular position is the angular acceleration, and in the determination process, the control circuitry is configured to determine that wear has occurred on the gear mechanism when a maximum value of an absolute value of the angular acceleration in the specific range is less than a predetermined acceleration threshold value.

8. The throttle control system according to claim 7, wherein the control circuitry stores a predetermined number of maximum values of the absolute value of the angular acceleration at the target angular position, the maximum values being updated to be included sequentially from newer ones of the maximum values each time the driving process is executed, and in the determination process, the control circuitry is configured to determine that wear has occurred on the gear mechanism when an average value of the stored maximum values of the absolute value of the angular acceleration is less than the acceleration threshold value.

9. A throttle control method for controlling a throttle device by control circuitry, the throttle control method comprising:

executing, by the control circuitry, a driving process that causes a target angular position of a specific gear to reach a predetermined initial position by continuing to increase or decrease the target angular position at a constant speed, wherein the throttle device includes:

an electric motor having a driving shaft;

a gear mechanism having gears, the gear mechanism being driven by rotation of the driving shaft;

a driven shaft that is rotated by the gear mechanism;

a throttle valve that is selectively opened and closed by rotation of the driven shaft;

a rotation sensor that obtains an angular position of the specific gear, the specific gear being one of the gears; and a spring mechanism that biases the specific gear such that the angular position becomes the initial position when the specific gear does not receive torque from the electric motor or the driven shaft; and executing, by the control circuitry, a determination process that determines that wear has occurred on the gear mechanism based on a parameter related to a change speed of the angular position in a specific range during execution of the driving process, the specific range being a range from a specific angular position to the initial position, and the specific angular position being the angular position that is separated from the initial position by a predetermined constant angle.

10. A non-transitory computer-readable memory medium that stores a program for causing a processor to execute a throttle control process that controls a throttle device, the throttle control process comprising:

executing, by the control circuitry, a driving process that causes a target angular position of a specific gear to reach a predetermined initial position by continuing to increase or decrease the target angular position at a constant speed, wherein the throttle device includes:

an electric motor having a driving shaft;

a gear mechanism having gears, the gear mechanism being driven by rotation of the driving shaft;

a driven shaft that is rotated by the gear mechanism;

a throttle valve that is selectively opened and closed by rotation of the driven shaft;

a rotation sensor that obtains an angular position of the specific gear, the specific gear being one of the gears; and a spring mechanism that biases the specific gear such that the angular position becomes the initial position when the specific gear does not receive torque from the electric motor or the driven shaft; and executing, by the control circuitry, a determination process that determines that wear has occurred on the gear mechanism based on a parameter related to a change speed of the angular position in a specific range during execution of the driving process, the specific range being a range from a specific angular position to the initial position, and the specific angular position being the angular position that is separated from the initial position by a predetermined constant angle.

* * * * *